(12) United States Patent
Sebire et al.

(10) Patent No.: US 7,366,477 B2
(45) Date of Patent: Apr. 29, 2008

(54) REDUNDANCY VERSION IMPLEMENTATION FOR AN UPLINK ENHANCED DEDICATED CHANNEL

(75) Inventors: Benoist Sebire, Beijing (CN); Esa Malkamäki, Espoo (FI)

(73) Assignee: Nokia Corporation (FI)

( * ) Notice: Subject to any disclaimer, the term of this patent is extended or adjusted under 35 U.S.C. 154(b) by 814 days.

(21) Appl. No.: 10/840,760

(22) Filed: May 6, 2004

(65) Prior Publication Data

US 2005/0250454 A1 Nov. 10, 2005

(51) Int. Cl.
*H04B 1/00* (2006.01)
*H04B 7/00* (2006.01)

(52) U.S. Cl. .................. 455/69; 455/500; 455/502; 455/418; 455/420; 455/67.11; 455/67.13; 455/68; 455/561; 455/466; 375/298; 714/748; 714/751; 714/789; 714/798; 370/252; 370/236; 370/503

(58) Field of Classification Search ........ 455/418–420, 455/500–502, 63.1, 88, 67.11–16, 68–70, 455/423–425, 435.1–3, 436–442, 434, 561, 455/450–451, 452.1–2, 466, 522, 295–296; 370/252, 318, 328–333, 320, 350, 431, 441, 370/437–438, 464–465, 467–468, 479, 503, 370/236; 375/260–261, 265, 280, 295–296, 375/298; 714/748–762, 786–799
See application file for complete search history.

(56) References Cited

U.S. PATENT DOCUMENTS

| | | | |
|---|---|---|---|
| 5,946,320 A | | 8/1999 | Decker |
| 6,122,504 A * | | 9/2000 | Niepel et al. ............ 455/422.1 |
| 6,798,846 B2 * | | 9/2004 | Golitschek Edler Von Elbwart et al. .......................... 375/298 |
| 6,978,156 B1 * | | 12/2005 | Papadopoulos et al. ..... 455/558 |
| 7,000,173 B2 * | | 2/2006 | Buckley et al. ............. 714/790 |
| 7,110,470 B2 * | | 9/2006 | Von Elbwart et al. ...... 375/298 |
| 7,260,770 B2 * | | 8/2007 | Stewart et al. ............. 714/790 |
| 2001/0016503 A1 * | | 8/2001 | Kang ......................... 455/561 |
| 2003/0110436 A1 | | 6/2003 | Von Elbwart et al. |
| 2004/0028020 A1 * | | 2/2004 | Frederiksen et al. ........ 370/342 |
| 2004/0221219 A1 | | 11/2004 | Von Elbwart et al. |
| 2005/0076283 A1 * | | 4/2005 | Malkamaki et al. ........ 714/748 |

FOREIGN PATENT DOCUMENTS

EP 1313250 5/2003

OTHER PUBLICATIONS

Ghosh, A., et al: "Incremental redundancy (IR) schemes for W-CDMA HS-DSCH". In: The 13th IEEE International Symposium on Personal, Indoor and Mobile Radio Communications, 2002. Sep. 15-18, 2002, vol. 3, pp. 1078-1082, INSPEC AN: 7678045, see section II.

(Continued)

*Primary Examiner*—Tuan A. Tran

(57) ABSTRACT

This invention describes a method for a redundancy version implementation of an uplink (UL) enhanced dedicated channel (E-DCH) in mobile communication systems by calculating a redundancy version number (RVN) as a function of a connection frame number (CFN), a maximum number of processed HARQs (hybrid automatic repeat requests) $N_{ARQ}$, and a number of redundancy versions $N_{RV}$. Instead of signaling a RV parameter outband in UL, the RVN is determined by the network element using simple rules which ensures that the same RVN is never used successively for the same HARQ process, and that all possible RV numbers are used for one HARQ process.

36 Claims, 3 Drawing Sheets

OTHER PUBLICATIONS

3GPP TX 25.212 V6.1.0 (Mar. 2004), 3rd Generation Partnership Project; Technical Specification Group Radio Access Network; Multiplexing and channel coding (FDD) (Release 6), 3GPP Organizational Partners, pp. 1-75.

3GPP TSG RAN WG1 Meeting #36, Malaga, Spain, Feb. 16-20, 2004, Tdoc R1-040207, Siemens, Feasibility of IR schemes for Enhanced Uplink DCH in SHO, 3 pages.

* cited by examiner

REDUNDANCY VERSION IMPLEMENTATION FOR AN UPLINK ENHANCED DEDICATED CHANNEL

FIELD OF THE INVENTION

This invention generally relates to mobile communication networks and more specifically to a redundancy version implementation of an uplink enhanced dedicated channel.

BACKGROUND OF THE INVENTION

1. Field of Technology and Background

In high speed downlink packet access (HSDPA) facilitating the direction of the radio link from a network to a user equipment (UE), different redundancy versions are created with the two-stage rate matching for the support of an incremental redundancy (IR). The first stage of the two-stage rate matching punctures the transport block such that it fits into the UE soft buffer (configured at the beginning of the connection which also depends on the UE capability). The second stage is used to generate different redundancy versions for the incremental redundancy (IR). It uses either repetition or puncturing. Further details are provided in "$3^{rd}$ Generation Partnership Project; Technical Specification Group Radio Access Network; Multiplexing and channel coding (FDD)", 3GPP TS 25.212, Section 4.5.4. The two-stage rate matching supports both chase combining and incremental redundancy.

For an uplink (UL) enhanced dedicated channel (UL E-DCH) facilitating the direction of the radio link from the UE to the network (e.g., network element), a similar mechanism can be used to generate different redundancy versions, allowing IR to be used in the uplink.

2. Problem Formulation

For HARQ (hybrid automatic repeat request) combining at the network element (e.g., node B, alternatively called base station), the knowledge of the redundancy version (RV) is critical to a decoding process. A wrong value of the RV leads to adverse effects (e.g., corruption of the soft buffer).

3. Prior Art

Because the knowledge of the RV is critical to the decoding process (HARQ combining at the Node B), a first obvious solution is to signal the RV outband (signaling which is sent separately from the data itself) with a strong forward error correction (channel coding) and a strong error detection (through the use of a large CRC). Outband signaling means signaling which is sent separately from the data itself. It is typically protected with its own CRC (cyclic redundancy check) and this channel is coded separately from the data channel. It can be also sent on a separate physical channel (similar to a shared control channel for a high speed downlink shared channel) or it can be alternatively sent on the same physical channel (e.g., dedicated physical data channel, DPDCH) as the data using, e.g., a different transport channel or a physical layer header structure. Unfortunately, using outband signaling leads to a significant overhead, which translates into a significant capacity loss.

An alternative option is proposed by Siemens in the report R1-040207, "Feasibility of IR Schemes for Enhanced Uplink DCH in SHO", 3GPP TSG RAN WG1 Meeting #36, where it is pointed out that in order to avoid signaling problems, the RV parameters should be calculated implicitly and that can be done, e.g., by determining the parameters from the connection frame number (CFN). Tying the RV to the frame numbering is also known from U.S. Pat. No. 5,946,320, "Method for Transmitting Packet Data with Hybrid FEC/ARG Type II"", by P. Decker.

FIG. 1 shows one example among others of a block diagram for a redundancy version implementation of an uplink enhanced dedicated channel, according to the prior art. In addition to a normal uplink (UL) data signal 22 sent by a user equipment 10 to a HARQ combiner/decoder module 14 of the network element (the node B) 12, the user equipment 10 also provides an outband RV signal 15 containing a redundancy version (RV) parameter (e.g., redundancy version number, RVN) using, for example, a separate uplink (UL) signaling channel, according to the prior art.

The HARQ combiner/decoder module 14 performs decoding and combining the data contained in said uplink data signal 22 and generating corrected data using said outband RV signal 15 and combining with (if it is received) previously received and stored data (e.g., using a soft buffer) redundant to the data contained in the uplink data signal 22. After performing said decoding, it is determined by the HARQ combiner/decoder module 14, whether the corrected data is acceptable according to a predetermined criterion. If the corrected data is acceptable according to said predetermined criterion, the HARQ combiner/decoder module 14 sends a corrected data signal 30 containing said corrected data to a further destination (e.g., another network element such as a radio network controller). However, if corrected data is not acceptable according to said predetermined criterion, the HARQ combiner/decoder module 14 sends a repeat request signal 28 to the user terminal 10 for sending a further redundancy version of said data one more time.

SUMMARY OF THE INVENTION

The object of the present invention is to provide a novel method for a redundancy version implementation of an uplink dedicated channel in mobile telecommunication systems.

According to a first aspect of the invention, a method for calculating a redundancy version number RVN for implementing a hybrid automatic repeat request (HARQ) protocol using multiple redundancy versions used for data transmitted in a communication system containing a transmitter and a receiver and with a connection frame number CFN known to the transmitter and to the receiver, comprising the steps of: providing a number of automatic repeat request processes $N_{ARQ}$ and a number of redundancy versions $N_{RV}$ to the receiver and the transmitter; calculating by the transmitter the redundancy version number RVN corresponding to said data as a function of the connection frame number CFN, the number of the automatic repeat request processes $N_{ARQ}$ and the number of the redundancy versions $N_{RV}$; and calculting by the receiver the redundancy version number RVN as a function of the connection frame number CFN, the number of the automatic repeat request processes $N_{ARQ}$ and the number of the redundancy versions $N_{RV}$, wherein said RVN is used to indicate which redundancy version of said data is sent from said transmitter and received by said receiver.

According further to the first aspect of the invention, the redundancy version number RVN may be calculated as follows (rule one):

$$RVN = \left(CFN' - \left\lfloor \frac{CFN'}{N_{ARQ}} \right\rfloor\right) \mod N_{RV}$$

if $(N_{ARQ} \mod 2 + N_{RV} \mod 2) = 0$, otherwise RVN=CFN'mod $N_{RV}$, wherein operator $\lfloor x \rfloor$ rounds x towards $-\infty$, i.e., integer such that $x-1 < \lfloor x \rfloor \leq x$, and CFN'=CFN, if CFN refers to radio frames with a transmission time interval TTI of 10 ms, otherwise CFN'=10 ms/TTI*CFN+SFN, wherein 10 ms mod TTI=0 and an SFN is a sub-frame number, which is an integer incremented by one from zero to 10 ms/TTI for each said redundancy version number RVN.

Further according to the first aspect of the invention, the redundancy version number RVN may be calculated as follows (rules):

$$RVN = \left\lfloor \frac{CFN'}{N_{ARQ}} \right\rfloor \bmod N_{RV},$$

wherein operator $\lfloor x \rfloor$ rounds x towards $-\infty$, i.e., integer such that $x-1 < \lfloor x \rfloor \leq x$, and CFN'=CFN, if CFN refers to radio frames with a transmission time interval TTI of 10 ms, otherwise CFN'=10 ms/TTI*CFN+SFN, wherein 10 ms mod TTI=0 and an SFN is a sub-frame number, which is an integer incremented by one from zero to 10 ms/TTI for each said redundancy version number RVN.

Still further according to the first aspect of the invention, the number of automatic repeat request processes $N_{ARQ}$ and said number of redundancy versions $N_{RV}$ may be provided to the receiver and to the transmitter by a system operator or said number of automatic repeat request processes $N_{ARQ}$ and said number of redundancy versions $N_{RV}$ may be permanently pre-set in the receiver and in the transmitter based on pre-existing system standards.

According further to the first aspect of the invention, the step of calculating by the transmitter the redundancy version number RVN further may include encoding said data according to said calculated RVN and sending said encoded data to the receiver. Further, the method may comprise the step of: decoding said data based on the calculated RVN and optionally combining said data with previously received redundancy versions of said data.

According still further to the first aspect of the invention, the receiver may be a user equipment of a mobile communication system, said transmitter may be a network element of said mobile communication system and said data may be sent through a downlink (DL) channel.

According further still to the first aspect of the invention, the number of automatic repeat request processes $N_{ARQ}$ and said number of redundancy versions $N_{RV}$ may be provided by a system operator by sending a parameter signal to an originating RV calculation module of the user equipment, to an RV calculation module of the network element and to an HARQ combiner/decoder module of the network element, and wherein said step of calculating by the transmitter the redundancy version number RVN may be performed by the originating RV calculation module and said step of calculating by the receiver the redundancy version number RVN may be performed by the RV calculation module. Further, the step of calculating by the user equipment the redundancy version number RVN may further include encoding said data according to said calculated RVN and sending an uplink data signal containing said encoded data to an HARQ combiner/decoder module of the network element. Still further, the step of calculating the redundancy version number RVN by the RV calculation module may further include providing an RVN signal containing said redundancy version number RVN to the HARQ combiner/decode module. Yet still further, the method may further comprise the step of: decoding of the data contained in said uplink data signal and optionally combining said data with a previously received redundancy version of the same data for a previously calculated RVN by the HARQ combiner/decoder module for generating corrected data. Yet further, the method may further comprise the step of: determining, after the decoding and combining said data, whether said corrected data is acceptable according to a predetermined criterion. Yet further still, if corrected data is not acceptable according to said predetermined criterion, the method may further comprise the step of: sending a repeat request signal by the HARQ combiner/decode module to the user equipment for sending a further redundancy version of said data one more time.

Yet still further according to the first aspect of the invention, the RV calculation module may be a part of the HARQ combiner/decoder module.

Still yet further according to the first aspect of the invention, the network element may be a node B or a base station of a mobile communication system.

According to a second aspect of the invention, a network element of a mobile communication system with a connection frame number CFN known to the network element, comprising: an RV calculation module, optionally responsive to a parameter signal containing a number of automatic repeat request processes $N_{ARQ}$ and a number of redundancy versions $N_{RV}$, for providing an RVN signal containing the redundancy version number RVN calculated as a function of said connection frame number CFN, the number of the automatic repeat request processes $N_{ARQ}$ and the number of the redundancy versions $N_{RV}$; and an HARQ combiner/decode module, responsive to said uplink data signal, to the parameter signal and to said RVN signal, for decoding said data based on said RVN signal and generating corrected data.

According further to the second aspect of the invention, the uplink data signal may be provided by a user equipment.

Further according to the second aspect of the invention, the decoding of said uplink data signal may be further based on combining said data with a previously received redundancy version of said data for a previously calculated RVN by the HARQ combiner/decoder module for generating said corrected data.

Still further according to the second aspect of the invention, if said corrected data is not acceptable according to a predetermined criterion, said HARQ combiner/decode module may send a repeat request signal to the user equipment for sending a further redundancy version of said data one more time.

According further to the second aspect of the invention, the network element may be a node B or a base station of a mobile communication system.

According still further to the second aspect of the invention, the RV calculation module may be a part of the HARQ combiner/decoder module.

According further still to the second aspect of the invention, the parameter signal may be provided by a system operator or said number of automatic repeat request processes $N_{ARQ}$ and said number of redundancy versions $N_{RV}$ may be permanently pre-set in the network element based on pre-existing system standards.

According yet further still to the second aspect of the invention, the RVN may be calculated using the rule one or the rule two according to the first aspect of the invention.

According to a third aspect of the invention, a user equipment of a mobile communication system with a connection frame number CFN known to the user equipment, comprising: an originating RV calculation module, optionally responsive to a parameter signal containing a number of automatic repeat request processes $N_{ARQ}$ and a number of redundancy versions $N_{RV}$, for calculating a redundancy version number RVN as a function of said connection frame number CFN, the number of the automatic repeat request processes $N_{ARQ}$ and the number of the redundancy versions $N_{RV}$, wherein said user equipment provides an uplink data signal containing data encoded according to said calculated RVN.

According further to the third aspect of the invention, the parameter signal may be provided by a system operator or said number of automatic repeat request processes $N_{ARQ}$ and said number of redundancy versions $N_{RV}$ may be permanently pre-set in the user equipment based on pre-existing system standards.

Further according to the third aspect of the invention, the uplink data signal may be provided to a network element.

Still further according to the third aspect of the invention, the user equipment may provide said uplink data signal containing a further redundancy version of said data in response to a repeat request signal from a network element.

According still further to the third aspect of the invention, the RVN may be calculated using the rule one or the rule two according to the first aspect of the invention.

According to a fourth aspect of the invention, a communication system containing a transmitter and a receiver and with a connection frame number CFN known to the transmitter and to the receiver for implementing a hybrid automatic repeat request (ARQ) protocol using multiple redundancy versions used for correcting transmitted data based on calculating a redundancy version number RVN, comprising: a user equipment, optionally responsive to a parameter signal containing a number of automatic repeat request processes $N_{ARQ}$ and a number of redundancy versions $N_{RV}$, for calculating the redundancy version number RVN as a function of the connection frame number CFN, the number of the automatic repeat request processes $N_{ARQ}$ and the number of the redundancy versions $N_{RV}$ and for providing an uplink data signal containing data encoded for said calculated RVN; and a network element, responsive to said uplink data signal and optionally to the parameter signal, for calculating the redundancy version number RVN as a function of the connection frame number CFN, the number of the automatic repeat request processes $N_{ARQ}$ and the number of the redundancy versions $N_{RV}$ and for providing decoding said data based on said redundancy version number RVN. According to a fifth aspect of the invention, a computer program product may comprise: a computer readable storage structure embodying computer program code thereon for execution by a computer processor with said computer program code characterized in that it includes instructions for performing the steps of the first aspect of the invention indicated as being performed by any components of the transmitter or the receiver.

Advantages of the present invention can be summarized as follows:

No need to send an RV parameter to the network element (e.g., node B);

Reduced overhead;

No errors associated with the decoding of the RV parameter;

Flexibility of configuring $N_{ARQ}$ and $N_{RV}$.

BRIEF DESCRIPTION OF THE DRAWINGS

For a better understanding of the nature and objects of the present invention, reference is made to the following detailed description taken in conjunction with the following drawings, in which.

BEST MODE FOR CARRYING OUT THE INVENTION

The present invention provides a method for a redundancy version implementation of an uplink (UL) enhanced dedicated channel (UL E-DCH) in mobile communication systems by calculating a redundancy version number RVN as a function of a connection frame number CFN, a number of automatic repeat request processes $N_{ARQ}$, and a number of redundancy versions $N_{RV}$. The methodology described in the present invention can be also applied to a downlink (DL) dedicated channel in a similar way.

Generally, the present invention is related to enhancement of the uplink dedicated channel for packet data traffic in Release 6 of 3GPP. The idea is to bring a similar L1 (physical layer)/MAC (medium access control) layer HARQ between the UE and the network element (Node B) in the uplink (UL) as in an HSDPA (high speed downlink packet access) for the downlink (DL). The fast HARQ (hybrid automatic repeat request) can be based, e.g., on an N-process SAW (Stop-And-Wait) HARQ, where HARQ combining is performed at Node B L1 layer, according to the present invention.

Instead of signaling an RV parameter outband in UL (an uplink direction of the radio link from a user equipment to a network element), RVN is determined by a receiver (e.g., the network element such as a Node B also called a base station) using simple rules described below, according to the present invention. The simple rule ensures that the same RVN is never used successively for the same HARQ process, and that all possible RVNs are used for one HARQ process.

Figure 1:
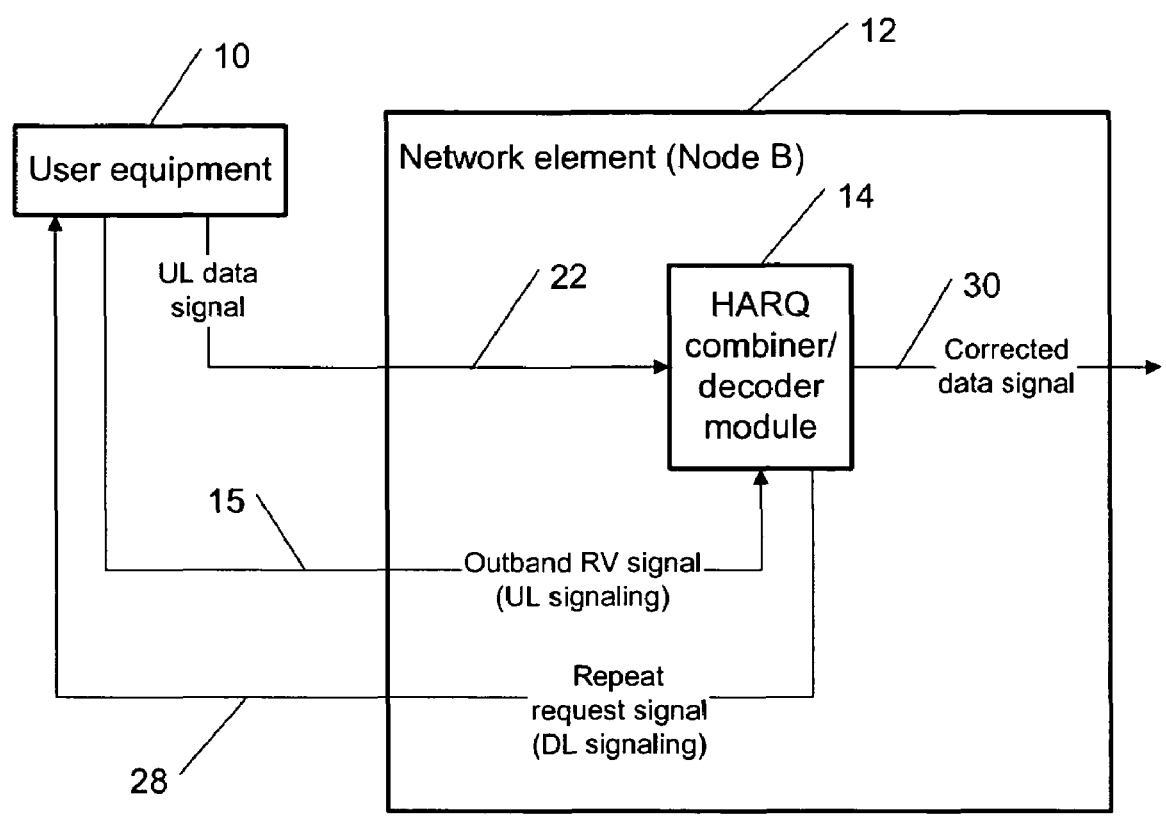
FIG. 1 shows an example of a block diagram for a redundancy version implementation of an uplink enhanced dedicated channel, according to the prior art.
Figure 2:
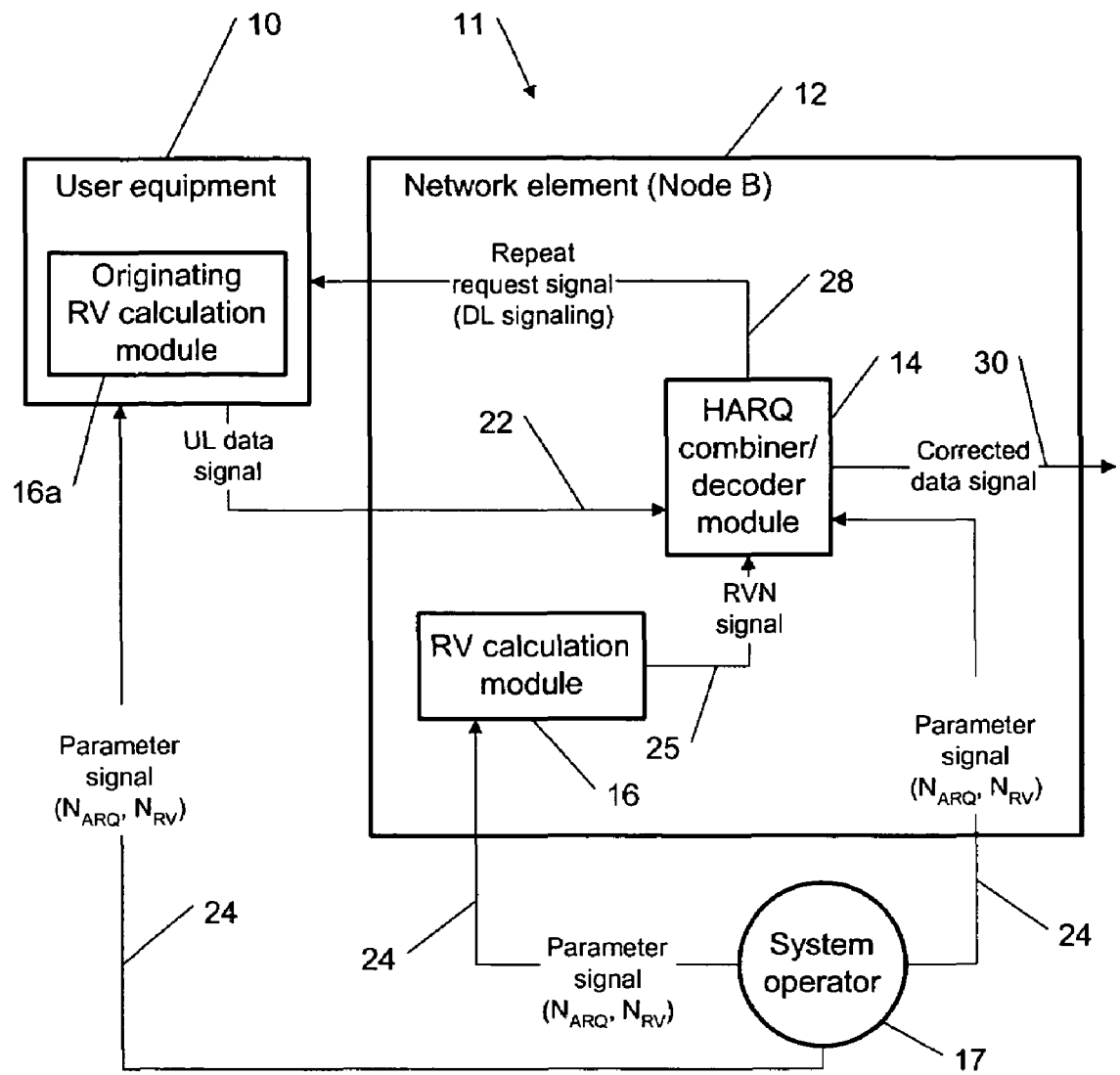
FIG. 2 shows an example of a block diagram for a redundancy version implementation of an uplink enhanced dedicated channel, according to the present invention.

FIG. 2 shows one example among others of a block diagram for a redundancy version implementation of an uplink enhanced dedicated channel (UL E-DCH) in a mobile communication system 11, according to the present invention. The major difference of the example of FIG. 2 with the prior art example of FIG. 1 is that, according to the present invention, the user equipment 10 does not provide the outband RV signal 15 using a separate uplink (UL) signaling channel. Instead, the redundancy version number RVN is determined by both an originating RV calculation module 16a of the user equipment 10 and an RV calculation module 16 (which, in alternative implementation, can be a part of the module 14) of the network element (e.g., node B) 12 using simple rules (outlined below) by calculating the RVN as a function of the connection frame number CFN, the number of the automatic repeat request processes $N_{ARQ}$, and the number of the redundancy versions $N_{RV}$. Based on the RVN calculated by the originating RV calculation module 16a the user equipment 10 encodes the data for the calculated RVN and sends the uplink data signal 22 containing said encoded data to a HARQ combiner/decoder module 14 of the network element 12. According to the present invention, the user equipment 10 does not send the RVN to the network element 12 as it is done in the prior art.

The data is initially encoded in the user equipment 10 using, e.g., rate ⅓ turbo code. After the initial encoding some encoded bits are either punctured or repeated (depending on the amount of available channel bits). This puncturing/repetition can be done in different ways, for instance in the first transmission odd numbered parity bits are punctured and in the retransmission even numbered parity bits are punctured. These different encoded versions correspond to different redundancy versions, represented by the redundancy version numbers (RVNs), calculated according to the present invention.

$N_{ARQ}$ and $N_{RV}$ contained in a parameter signal 24 can be provided (set or re-set) to the modules 16, 16a and 14 by a system operator 17. The current value of the CFN is known, e.g., determined (assigned) by a layer L1 counter. For every radio frame, the new CFN is determined from an expression CFN=CFN+1, i.e., the CFN is incremented for every radio frame, even if no data is transmitted. At the beginning of a connection, the CFN counters of the user equipment 10 and the network element 12 are synchronized. A HARQ process identification (ID) can be either sent outband or calculated by the modules 14, 16 and/or 16a from the CFN similarly to calculating RVN. The proposed $N_{ARQ}$-process stop-and-wait (SAW) HARQ protocol uses $N_{ARQ}$ separate HARQ processes. For each process the SAW protocol is used, i.e., a data block is repeated (and combined with the previous versions of the same block) until it is correctly decoded. The HARQ process ID is needed to keep these HARQ processes separate.

After calculating the RVN according to the present invention, an RVN signal 25 containing said RVN is provided by the RV calculation module 16 to the HARQ combiner/decode module 14 to perform decoding and combining (e.g., using the RVN, the HARQ process ID and $N_{ARQ}$) equivalent to the prior art decoding described above in regard to FIG. 1.

The rules for calculating RVN are described below, according to the present invention. The following notations are used in equations presented below.

$\lfloor x \rfloor$ round x towards $-\infty$, i.e., integer such that $x-1 < \lfloor x \rfloor \leq x$.

$\lceil x \rceil$ round x towards $+\infty$, i.e., integer such that $x \leq \lceil x \rceil < x+1$.

A first rule for calculating RVN is described as follows:

if $(N_{ARQ} \bmod 2 + N_{RV} \bmod 2) = 0$, then $RVN = \left( CFN - \left\lfloor \frac{CFN}{N_{ARQ}} \right\rfloor \right) \bmod N_{RV}$, (1)

otherwise $RVN = CFN \bmod N_{RV}$ (2).

According to the present invention, it is required to ensure that if $N_{ARQ}$ is a multiple of $N_{RV}$, a different RVN is always used in consecutive transmissions/re-transmissions of the same HARQ process.

Note that instead of using $$\left\lfloor \frac{CFN}{N_{ARQ}} \right\rfloor,$$

another simple rule can be also applied by using $$\left\lceil \frac{CFN}{N_{ARQ}} \right\rceil.$$

Then according to the present invention, a second rule for calculating RV can be expressed as follows:

$$RVN = \left\lfloor \frac{CFN}{N_{ARQ}} \right\rfloor \bmod N_{RV}. \quad (3)$$

The difference between the two rules lies in the way the RVNs are output. The first rule provides more "diverse" RVNs. In the Tables 1, 2 and 3 below, some examples are given for different values of $N_{ARQ}$, $N_{RV}$ and 17 frames of data (CFN is from 0 to 16). An automatic repeat request value ARQV (second column) is the HARQ process ID which in this example is an integer with values from zero to the number of the automatic repeat request processes $N_{ARQ}$ minus one and can be expressed, for instance, as follows: ARQV=CFN mod $N_{ARQ}$.

It can be easily verified (see Tables 1, 2 and 3) that the rule/requirement described above ensures that the same RVN is never used successively for the same HARQ process, and that all possible RVNs are used for one HARQ process.

TABLE 1

RVN values with $N_{ARQ} = 4$ and $N_{RV} = 2$

| CFN | ARQV | RVN (rule 1) | RVN (rule 2) |
|---|---|---|---|
| 0 | 0 | 0 | 0 |
| 1 | 1 | 1 | 0 |
| 2 | 2 | 0 | 0 |
| 3 | 3 | 1 | 0 |
| 4 | 0 | 1 | 1 |
| 5 | 1 | 0 | 1 |
| 6 | 2 | 1 | 1 |
| 7 | 3 | 0 | 1 |
| 8 | 0 | 0 | 0 |
| 9 | 1 | 1 | 0 |
| 10 | 2 | 0 | 0 |
| 11 | 3 | 1 | 0 |
| 12 | 0 | 1 | 1 |
| 13 | 1 | 0 | 1 |
| 14 | 2 | 1 | 1 |
| 15 | 3 | 0 | 1 |
| 16 | 0 | 0 | 0 |

TABLE 2

RVN values with $N_{ARQ} = 3$ and $N_{RV} = 2$

| CFN | ARQV | RVN (rule 1) | RVN (rule 2) |
|---|---|---|---|
| 0 | 0 | 0 | 0 |
| 1 | 1 | 1 | 0 |
| 2 | 2 | 0 | 0 |

TABLE 2-continued

RVN values with $N_{ARQ} = 3$ and $N_{RV} = 2$

| CFN | ARQV | RVN (rule 1) | RVN (rule 2) |
|---|---|---|---|
| 3 | 0 | 1 | 1 |
| 4 | 1 | 0 | 1 |
| 5 | 2 | 1 | 1 |
| 6 | 0 | 0 | 0 |
| 7 | 1 | 1 | 0 |
| 8 | 2 | 0 | 0 |
| 9 | 0 | 1 | 1 |
| 10 | 1 | 0 | 1 |
| 11 | 2 | 1 | 1 |
| 12 | 0 | 0 | 0 |
| 13 | 1 | 1 | 0 |
| 14 | 2 | 0 | 0 |
| 15 | 0 | 1 | 1 |
| 16 | 1 | 0 | 1 |

TABLE 3

RVN values with $N_{ARQ} = 5$ and $N_{RV} = 4$

| CFN | ARQV | RVN (Rule 1) | RVN (Rule 2) |
|---|---|---|---|
| 0 | 0 | 0 | 0 |
| 1 | 1 | 1 | 0 |
| 2 | 2 | 2 | 0 |
| 3 | 3 | 3 | 0 |
| 4 | 4 | 0 | 0 |
| 5 | 0 | 1 | 1 |
| 6 | 1 | 2 | 1 |
| 7 | 2 | 3 | 1 |
| 8 | 3 | 0 | 1 |
| 9 | 4 | 1 | 1 |
| 10 | 0 | 2 | 2 |
| 11 | 1 | 3 | 2 |
| 12 | 2 | 0 | 2 |
| 13 | 3 | 1 | 2 |
| 14 | 4 | 2 | 2 |
| 15 | 0 | 3 | 3 |
| 16 | 1 | 0 | 3 |

In today's mobile communication networks, the CFN refers to 10 ms radio frames. If the TTI (transmission time interval) is 10 ms then the above algorithms (see Equations 1 through 3) are correct. However, if a shorter TTI, e.g., 2 ms, is used, then some new TTI based numbering is needed. For instance, each 2 ms sub-frame could be given a sub-frame number from zero to four and in the above Equations 1, 2 and 3 instead of CFN, the following TTI number can be used instead:

$$\text{TTI number} = 5*\text{CFN} + \text{sub-frame number} \quad (4).$$

Figure 3:
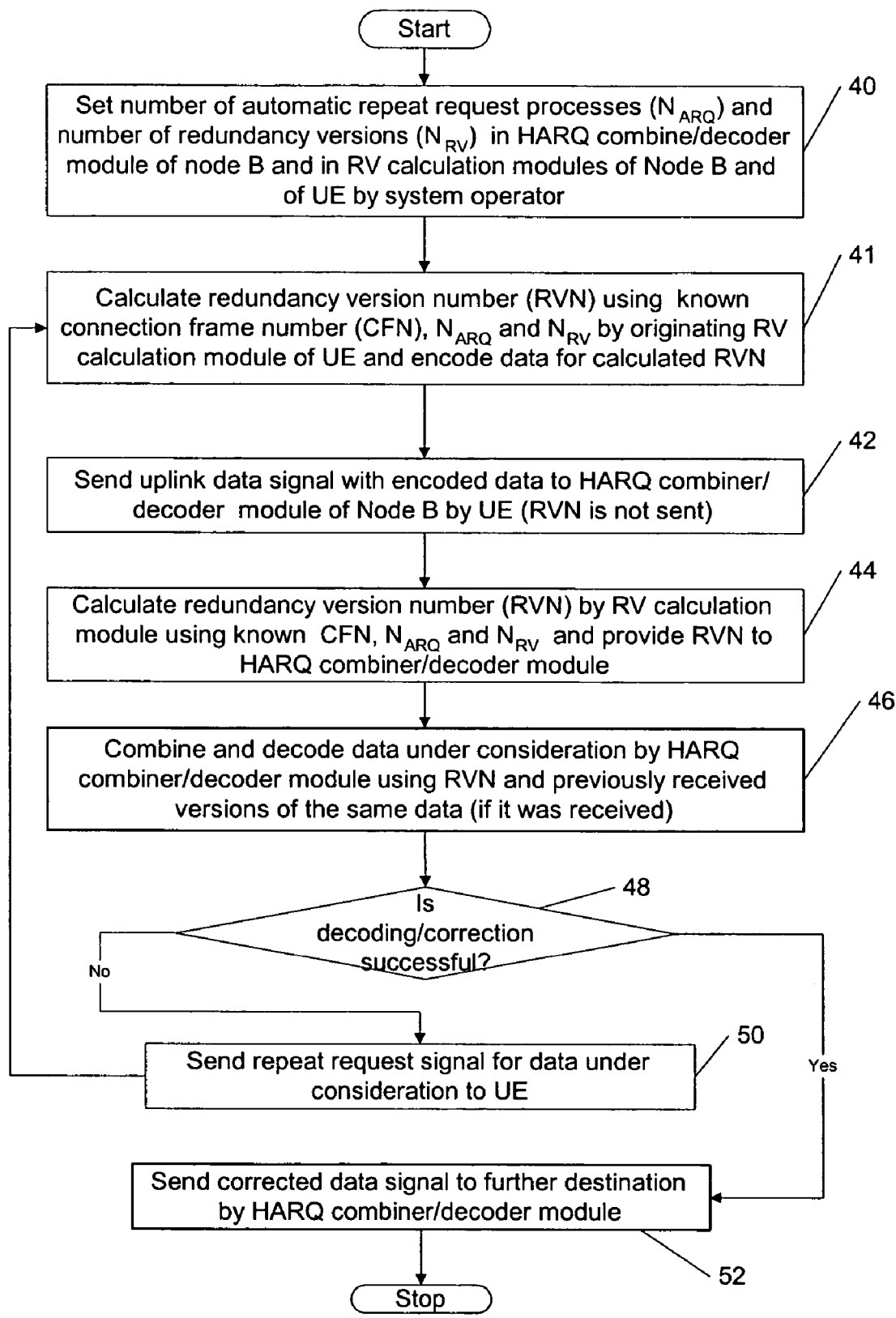
FIG. 3 shows an example of a flow chart for a redundancy version implementation of an uplink enhanced dedicated channel, according to the present invention.

FIG. 3 shows an example of a flow chart for the redundancy version implementation of the uplink enhanced dedicated channel, according to the present invention.

The flow chart of FIG. 3 represents only one possible scenario among many others. In a method according to the present invention, in a first step 40, the system operator 17 sets the number of automatic repeat request processes $N_{ARQ}$ and the number of the redundancy versions $N_{RV}$ in the originating RV calculation module 16a of the user equipment 10, in the RV calculation module 16 and in the HARQ combiner/decoder module 14 of the network element 12 by providing a parameter signal 24. Alternatively, these parameters can have fixed values (specified in the standard). In a next step 41, the originating RV calculation module 16a calculates the RVN as a function of the known connection frame number CFN, $N_{ARQ}$ and $N_{RV}$ and which is used by the user equipment 10 for encoding said data for said calculated RVN.

In a next step 42, the uplink data signal 22 containing the encoded data is sent to the HARQ combiner/decoder module 14 by the user equipment 10. In a next step 44, the redundancy version number RVN is calculated by the RV calculation module 16 as a function of the CFN, $N_{ARQ}$ and $N_{RV}$, and the RVN signal 25 containing said RVN is provided to the HARQ combiner/decode module 14. In a next step 46, the data contained in said uplink data signal 22 is decoded by the HARQ combiner/decoder module 14 using said RVN provided by the RVN signal 25 and possibly combined with previously received versions of redundant data (according to a previously calculated RVN) stored in the module 14 and the corrected data is generated.

In a next step 48, it is ascertained whether said corrected data is acceptable according to a predetermined criterion. As long as that is the case, the process goes to step 52. However, if it is ascertained that said corrected data is not acceptable according to a predetermined criterion, in a next step 50, the repeat request signal 28 is sent to the user terminal 10 by the HARQ combiner/decode module 14 for sending a further redundancy version of said data one more time. After step 50, the process goes back to step 41 to facilitate the request of step 50. Finally, in a step 52, the corrected data signal 30 containing said corrected data is sent to the further destination (e.g., another network element such as a radio network controller) by the HARQ combiner/decode module 14.

What is claimed is:

1. A method, comprising:
   providing a number of automatic repeat request processes $N_{ARQ}$ and a number of redundancy versions $N_{RV}$ to a receiver and a transmitter;
   calculating by the transmitter a redundancy version number RVN corresponding to data transmitted in communication system as a function, of the connection frame number CFN, the number of the automatic repeat request processes $N_{ARQ}$ and the number of the redundancy versions $N_{RV}$; and
   calculating by the receiver the redundancy version number RVN as a function of the connection frame number CFN, the number of the automatic repeat request processes $N_{ARQ}$ and the number of the redundancy versions $N_{RV}$, wherein said RVN is used to indicate which redundancy version of said data is sent from the transmitter and received by the receiver. and with the connection frame number CFN known to the transmitter and to the receiver.

2. The method of claim 1, wherein said redundancy version number RVN is calculated as follows:

$$RVN = \left(CFN' - \left\lfloor \frac{CFN'}{N_{ARQ}} \right\rfloor\right) \bmod N_{RV}$$

if $(N_{ARQ} \bmod 2 + N_{RV} \bmod 2) = 0$, otherwise RVN=CFN' mod $N_{RV}$,
wherein operator $\lfloor x \rfloor$ rounds x towards $-\infty$, i.e., integer such that $x-1 < \lfloor x \rfloor \leq x$,
and CFN'=CFN, if CFN refers to radio frames with a transmission time interval TTI of 10 ms,
otherwise CFN'=10 ms/TTI*CFN+SFN, wherein 10 ms mod TTI=0 and an SFN is a sub-frame number, which is an integer incremented by one from zero to 10 ms/TTI for each said redundancy version number RVN.

3. The method of claim 1, wherein said redundancy version number RVN is calculated as follows:

$$RVN = \left\lfloor \frac{CFN'}{N_{ARQ}} \right\rfloor \mod N_{RV},$$

wherein operator $\lfloor x \rfloor$ rounds x towards $-\infty$, i.e., integer such that $x-1 < \lfloor x \rfloor \leq x$, and CFN'=CFN, if CFN refers to radio frames with a transmission time interval TTI of 10 ms, otherwise CFN'=10 ms/TTI*CFN+SFN, wherein 10 ms mod TTI=0 and an SFN is a sub-frame number, which is an integer incremented by one from zero to 10 ms/TTI for each said redundancy version number RVN.

4. The method of claim 1, wherein said number of automatic repeat request processes $N_{ARQ}$ and said number of redundancy versions $N_{RV}$ are provided to the receiver and to the transmitter by a system operator or said number of automatic repeat request processes $N_{ARQ}$ and said number of redundancy versions $N_{RV}$ are permanently pre-set in the receiver and in the transmitter based on pre-existing system standards.

5. The method of claim 1, wherein said calculating by the transmitter the redundancy version number RVN further includes encoding said data according to said calculated RVN and sending said encoded data to the receiver.

6. The method of claim 5, further comprises:
decoding said data based on the calculated RVN and optionally combining said data with a previously received redundancy versions of said data.

7. The method of claim 1, wherein said receiver is a user equipment of a mobile communication system, said transmitter is a network element of said mobile communication system and said data is sent through a downlink channel.

8. The method of claim 1, wherein said transmitter is a user equipment of a mobile communication system, said receiver is a network element of said mobile communication system, and said data is sent through an uplink channel.

9. The method of claim 8, wherein said number of automatic repeat request processes $N_{ARQ}$ and said number of redundancy versions $N_{RV}$ are provided by a system operator by sending a parameter signal to an originating RV calculation module of the user equipment, to an RV calculation module of the network element and to an HARQ combiner/decoder module of the network element, and wherein said calculating by the transmitter the redundancy version number RVN is performed by the originating RV calculation module and said calculating by the receiver the redundancy version number RVN is performed by the RV calculation module.

10. The method of claim 9, wherein said calculating by the user equipment the redundancy version number RVN further includes encoding said data according to said calculated RVN and sending an uplink data signal containing said encoded data to an HARQ combiner/decoder module of the network element.

11. The method of claim 10, wherein the calculating the redundancy version number RVN by the RV calculation module further includes providing an RVN signal containing said redundancy version number RVN to the HARQ combiner/decode module.

12. The method of claim 11, further comprising:
decoding of the data contained in said uplink data signal and optionally combining said data with a previously received redundancy version of the same data for a previously calculated RVN by the HARQ combiner/decoder module for generating corrected data.

13. The method of claim 12, further comprising:
determining, after the decoding and combining said data, whether said corrected data is acceptable according to a predetermined criterion.

14. The method of claim 13, wherein if corrected data is not acceptable according to said predetermined criterion, the method further comprises:
sending a repeat request signal by the HARQ combiner/decode module to the user equipment for sending a further redundancy version of said data one more time.

15. The method of claim 10, wherein said RV calculation module is a part of the HARQ combiner/decoder module.

16. The method of claim 8, wherein said network element is a node B or a base station of said mobile communication system.

17. A computer program product comprising: a computer readable storage structure embodying computer program code thereon for execution by a computer processor, wherein said computer program code comprises instructions for the computer processor performing the method of claim 1 indicated as being performed by any components of the transmitter or the receiver.

18. A network element, comprising:
an RV calculation module, responsive to a parameter signal containing a number of automatic repeat request processes $N_{ARQ}$ and a number of redundancy versions $N_{RV}$, if said number of automatic repeat request processes $N_{ARQ}$ and said number of redundancy versions $N_{RV}$ are not pre-set, for providing an RVN signal containing the redundancy version number RVN calculated as a function of a connection frame number CFN, known to the network element, the number of the automatic repeat request processes $N_{ARQ}$ and the number of the redundancy versions $N_{RV}$; and
an HARQ combiner/decode module, responsive to an uplink data signal, to the parameter signal and to said RVN signal, for decoding said data based on said RVN signal and generating corrected data.

19. The network element of claim 18, wherein said uplink data signal is provided by a user equipment.

20. The network element of claim 18, wherein said decoding of said uplink data signal is further based on combining said data with a previously received redundancy version of said data for a previously calculated RVN by the HARQ combiner/decoder module for generating said corrected data.

21. The network element of claim 18, wherein, if said corrected data is not acceptable according to a predetermined criterion, said HARQ combiner/decode module is configured to send a repeat request signal to the user equipment for sending a further redundancy version of said data one more time.

22. The network element of claim 18, wherein said RV calculation module is a part of the HARQ combiner/decoder module.

23. The network element of claim 18, wherein said parameter signal is provided by a system operator or said number of automatic repeat request processes $N_{ARQ}$ and said number of redundancy versions $N_{RV}$ are permanently pre-set in the network element based on pre-existing system standards.

24. The network element of claim 18, wherein said RV calculation module is configured to calculate said redundancy version number RVN follows:

$$RVN = \left(CFN' - \left\lfloor \frac{CFN'}{N_{ARQ}} \right\rfloor\right) \bmod N_{RV}$$

if $(N_{ARQ} \bmod 2 + N_{RV} \bmod 2) = 0$, otherwise RVN=CFN' mod $N_{RV}$,
wherein operator $\lfloor x \rfloor$ rounds x towards $-\infty$, i.e., integer such that $x-1 < \lfloor x \rfloor \leq x$,
and CFN'=CFN, if CFN refers to radio frames with a transmission time interval TTI of 10 ms,
otherwise CFN'=10 ms/TTI*CFN+SFN,
wherein 10 ms mod TTI=0 and an SFN is a sub-frame number, which is an integer incremented by one from zero to 10 ms/TTI for each said redundancy version number RVN.

25. The network element of claim 18, wherein said RV calculation module is configured to calculate said redundancy version number RVN as follows:

$$RVN = \left\lfloor \frac{CFN'}{N_{ARQ}} \right\rfloor \bmod N_{RV},$$

wherein operator $\lfloor x \rfloor$ rounds x towards $-\infty$, i.e., integer such that $x-1 < \lfloor x \rfloor \leq x$,
and CFN'=CFN, if CFN refers to radio frames with a transmission time interval TTI of 10 ms,
otherwise CFN'=10 ms/TTI*CFN+SFN,
wherein 10 ms mod TTI=0 and an SFN is a sub-frame number, which is an integer incremented by one from zero to 10 ms/TTI for each said redundancy version number RVN.

26. A user equipment, comprising:
an originating RV calculation module, responsive to a parameter signal containing a number of automatic repeat request processes $N_{ARQ}$ and a number of redundancy versions $N_{RV}$, if said number of automatic repeat request processes $N_{ARQ}$ and said number of redundancy versions $N_{RV}$ are not pre-set, for calculating a redundancy version number RVN as a function of a connection frame number CFN known to the user equipment, the number of the automatic repeat request processes $N_{ARQ}$ and the number of the redundancy versions $N_{RV}$,
wherein said user equipment is configured to provide an uplink data signal containing data encoded according to said calculated RVN.

27. The user equipment of claim 26, wherein said parameter signal is provided by a system operator or said number of automatic repeat request processes $N_{ARQ}$ and said number of redundancy versions $N_{RV}$ are permanently pre-set in the user equipment based on pre-existing system standards.

28. The user equipment of claim 27, wherein said uplink data signal is provided to a network element.

29. The user equipment of claim 26, wherein said user equipment is configured to provide said uplink data signal containing a further redundancy version of said data in response to a repeat request signal from a network element.

30. The user equipment of claim 26, wherein said originating RV calculation module is configured to calculate said redundancy version number RVN as follows:

$$RVN = \left(CFN' - \left\lfloor \frac{CFN'}{N_{ARQ}} \right\rfloor\right) \bmod N_{RV}$$

if $(N_{ARQ} \bmod 2 + N_{RV} \bmod 2) = 0$, otherwise RVN=CFN' mod $N_{RV}$,
wherein operator $\lfloor x \rfloor$ rounds x towards $-\infty$, i.e., integer such that $x-1 < \lfloor x \rfloor \leq x$,
and CFN'=CFN, if CFN refers to radio frames with a transmission time interval TTI of 10 ms,
otherwise CFN'=10 ms/TTI*CFN+SFN,
wherein 10 ms mod TTI=0 and an SFN is a sub-frame number, which is an integer incremented by one from zero to 10 ms/TTI for each said redundancy version number RVN.

31. The user equipment of claim 26, wherein said originating RV calculation module is configured to calculate said redundancy version number RVN as follows:

$$RVN = \left\lfloor \frac{CFN'}{N_{ARQ}} \right\rfloor \bmod N_{RV},$$

wherein operator $\lfloor x \rfloor$ rounds x towards $-\infty$, i.e., integer such that $x-1 < \lfloor x \rfloor \leq x$,
and CFN'=CFN, if CFN refers to radio frames with a transmission time interval TTI of 10 ms,
otherwise CFN'=10 ms/TTI*CFN+SFN,
wherein 10 ms mod TTI=0 and an SFN is a sub-frame number, which is an integer incremented by one from zero to 10 ms/TTI for each said redundancy version number RVN.

32. A communication system, comprising:
a user equipment, responsive to a parameter signal containing a number of automatic repeat request processes $N_{ARQ}$ and a number of redundancy versions $N_{RV}$ if said number of automatic repeat request processes $N_{ARQ}$ and said number of redundancy versions $N_{RV}$ are not pre-set, for calculating a redundancy version number RVN as a function of a connection frame number CFN, the number of the automatic repeat request processes $N_{ARQ}$ and the number of the redundancy versions $N_{RV}$ and for providing an uplink data signal containing data encoded for said calculated RVN; and
a network element, responsive to said uplink data signal and to the parameter signal if said number of automatic repeat request processes $N_{ARQ}$ and said number of redundancy versions $N_{RV}$ are not preset, for calculating the redundancy version number RVN as a function of the connection frame number CFN, the number of the automatic repeat request processes $N_{ARQ}$ and the number of the redundancy versions $N_{RV}$ and for providing decoding said data based on said redundancy version number RVN, wherein said connection frame number CFN known to the user equipment and to the network element.

33. The communication system of claim 32, wherein said number of automatic repeat request processes $N_{ARQ}$ and said number of redundancy versions $N_{RV}$ are provided to the network element and to the user equipment by a system operator or said number of automatic repeat request processes $N_{ARQ}$ and said number of redundancy versions $N_{RV}$ are permanently pre-set in the network element and in the user equipment based on pre-existing system standards.

34. The communication system of claim 32, wherein said network element is a node B or a base station of said communication system.

35. A network element, comprising:
   means for calculation, responsive to a parameter signal containing a number of automatic repeat request processes $N_{ARQ}$ and a number of redundancy versions $N_{RV}$, if said number of automatic repeat request processes $N_{ARQ}$ and said number of redundancy versions $N_{RV}$ are not pre-set, for providing an RVN signal containing the redundancy version number RVN calculated as a function of a connection frame number CFN known to the network element, the number of the automatic repeat request processes $N_{ARQ}$ and the number of the redundancy versions $N_{RV}$; and
   means for combining/decoding, responsive to an uplink data signal, to the parameter signal and to said RVN signal, for decoding said data based on said RVN signal and generating corrected data.

36. The network element of claim 35, wherein said uplink data signal is provided by a user equipment.

* * * * *

UNITED STATES PATENT AND TRADEMARK OFFICE
CERTIFICATE OF CORRECTION

PATENT NO. : 7,366,477 B2
APPLICATION NO. : 10/840760
DATED : April 29, 2008
INVENTOR(S) : Benoist Sebire and Esa Malkamäki It is certified that error appears in the above-identified patent and that said Letters Patent is hereby corrected as shown below:

In column 10, line 49, which is claim 1, line 17, "." should be deleted.
In column 12, line 30, which is claim 17, line 6, after "claim 1" -- , -- should be inserted.
In column 12, line 30, which is claim 17, line 6, "any components of" should be deleted.
In column 13, line 6, which is claim 24, line 3, after "RVN" -- as -- should be inserted.

Signed and Sealed this

Twenty-second Day of December, 2009

David J. Kappos
*Director of the United States Patent and Trademark Office*